United States Patent
Bertsch et al.

(10) Patent No.: US 7,847,026 B2
(45) Date of Patent: Dec. 7, 2010

(54) EPOXY RESINS ADDUCTED WITH REACTIVE LIQUID RUBBER HAVING IMPROVED LOW TEMPERATURE PERFORMANCE PROPERTIES

(75) Inventors: Roert J. Bertsch, Brecksville, OH (US); Jeremy J. Pasatta, Olmsted Falls, OH (US)

(73) Assignee: Emerald Specialty Polymers, LLC., Akron, OH (US)

( * ) Notice: Subject to any disclaimer, the term of this patent is extended or adjusted under 35 U.S.C. 154(b) by 56 days.

(21) Appl. No.: 12/214,602

(22) Filed: Jun. 20, 2008

(65) Prior Publication Data

US 2009/0318636 A1  Dec. 24, 2009

(51) Int. Cl.
C08F 8/00 (2006.01)
C08F 283/00 (2006.01)
C08G 63/48 (2006.01)

(52) U.S. Cl. ............... 525/113; 525/50; 525/55; 525/107; 525/540

(58) Field of Classification Search ............. 525/113; 523/113
See application file for complete search history.

(56) References Cited

U.S. PATENT DOCUMENTS 3,914,334 A * 10/1975 Lubowitz et al. ............ 525/108
5,280,068 A * 1/1994 Siebert et al. ............... 525/108

FOREIGN PATENT DOCUMENTS

JP  59058024 A  *  4/1984
JP  07138344 A  *  5/1995

OTHER PUBLICATIONS

Noveon, Product Data Sheets: Hycar Reactive Liquid Polymers CTBN 1300X8 & CTBN 1300X8F, 2009, Noveon.*
English translation of JP Patent Pub No. 59-058024 A, Azuma et al, Apr. 3, 1984.*
English machine translation of JP Patent Pub No. 07-138344, Makise, H., May 30, 1995.*

* cited by examiner

*Primary Examiner*—Mark Eashoo
*Assistant Examiner*—David Karst
(74) *Attorney, Agent, or Firm*—Hudak, Shunk & Farine Co. LPA

(57) ABSTRACT

A blend of epoxy resins includes a) an epoxy resin composition derived from the reaction of a liquid epoxy resin, a carboxyl terminated butadiene (CTB), and a carboxyl terminated polybutadiene-acrylonitrile (CTBN) and/or a random and terminal carboxyl functional polybutadiene-acrylonitrile (CTBNX), and b) unreacted epoxy resin. The carboxyl terminated butadiene is miscible with the unreacted epoxy resin and does not separate therefrom even upon aging. Upon cure as with a latent cure agent, a toughened epoxy resin is produced having unexpected good low temperature properties such as peel strength.

20 Claims, No Drawings

EPOXY RESINS ADDUCTED WITH REACTIVE LIQUID RUBBER HAVING IMPROVED LOW TEMPERATURE PERFORMANCE PROPERTIES

FIELD OF THE INVENTION

The present invention relates to a blend of an unreacted epoxy resin, and an uncured reacted epoxy resin composition that is synthesized from the reaction of a liquid epoxy resin with liquid rubbers such as a carboxyl terminated polybutadiene (CTB) optionally having a low bound acrylonitrile content of 12% by weight or less, a carboxyl terminated poly (butadiene-acrylonitrile) (CTBN) or a random pendant and terminal carboxyl functional poly(butadiene-acrylonitrile) (CTBNX) or both CTBN and CTBNX. The blend has low viscosity and the CTB is miscible with the unreacted epoxy and does not separate out even after aging. Upon cure, the blend of epoxy resins has unexpected improved properties such as low temperature peel strength and if an adhesive formulation is aged before curing it has even better cured properties.

BACKGROUND OF THE INVENTION

Heretofore, reactive liquid polymer (RLP) epoxy adducts have been used for many years for toughening composites and adhesives. They provide outstanding improvement at room temperature, but are only minimally effective at lower temperatures. An epoxy adduct using CTB can improve low temperature performance, but the CTB, with no or low bound acrylonitrile content, is not miscible in uncured epoxy and will separate upon aging.

SUMMARY OF THE INVENTION

Rubber modified epoxy resin adducts are formed by reacting one or more epoxy resins with one or more CTB, optionally containing low amounts of acrylonitrile therein, and based upon the CTB also reacted with generally equal or greater amounts by weight of one or more CTBN or one or more CTBNX or both one or more CTBN and one or more CTBNX, herein after "CTBN and/or CTNBX". Both the CTBN and the CTBNX have high bound acrylonitrile content. An excess stoichiometric amount of the one or more liquid epoxy resins is utilized to form a reacted epoxy resin composition. Upon blending with one or more unreacted epoxy resins the CTB is miscible with the unreacted epoxy resin(s) even upon extended storage. Upon cure of the blended epoxy resin composition with a curing agent such as dicyandiamide, unexpected low temperature properties are obtained such as peel strength, especially if an adhesive formulation has been aged before curing.

In one aspect, a blend of epoxy resin is disclosed, comprising a reaction of one or more epoxy resins with one or more CTB and with one or more CTBN or one or more CTBNX or both said CTBN and said CTBNX, wherein the weight ratio of said CTBN or said CTBNX or both said CTBN and said CTBNX to said CTB is from about 1.0 to about 3.0, wherein said CTBN and said CTBNX have a nitrile content, independently, of from about 20% to about 40% by weight, and wherein the equivalent weight of the total amount of said epoxy resin to the total equivalent weight of said CTB and CTBN or CTBNX or both said CTBN or CTBNX is from about 2.0 to about 2.5, and an amount of unreacted epoxy resin so that the total amount of said CTB, said CTBN or said CTBNX or both said CTBN and CTBNX is from about 5 parts to about 40 parts by weight per 100 total parts by weight of said reacted and said unreacted epoxy resin.

In another aspect, a process is disclosed for making a blend containing a CTB rubber adducted epoxy resin comprising the steps of: reacting one or more epoxy resins with one or more CTB and with one or more CTBN or one or more CTBNX or both said CTBN and said CTBNX, wherein the weight ratio of said CTBN or said CTBNX or both said CTBN and said CTBNX to said CTB is from about 1.0 to about 3.0, wherein said CTB optionally contains a nitrile content of from about 0.1% to about 12% by weight, wherein said CTBN and said CTBNX have a nitrile content, independently, of from about 20% to about 40% by weight, and wherein an equivalent weight of the total amount of said one or more epoxy resins to the total equivalent weight of said CTB, said CTBN or said CTBNX or both CTBN and CTBNX is from about 2.0 to about 2.5, and blending said reacted epoxy resin with an unreacted epoxy resin so that the total amount of said CTB, said CTBN or said CTBNX or both CTBN and said CTBNX is from about 5 parts to about 40 parts by weight per 100 total parts by weight of said reacted and said unreacted epoxy resin; and wherein said CTB is miscible in said unreacted epoxy resin.

DETAILED DESCRIPTION OF THE INVENTION

The one or more liquid epoxy resins utilized in the present invention are known to the art and to the literature and include various commercially-available epoxy resins. Examples of such epoxy resins or polymers include: glycidyl ethers of novolac resins such as epoxylated phenol-formaldehyde novolac resin; glycidyl ethers of di-, and trihydric phenols; glycidyl ethers of bisphenols such as diglycidyl ether of bisphenol A or tetrabromobisphenol A; glycidyl ethers of polynuclear phenols; epoxy resin made from diphenolic acid; glycidyl ethers of aliphatic polyols: glycidyl esters such as aliphatic diacid glycidyl esters and epoxidized fatty acids; glycidyl epoxies containing nitrogen such as glycidyl amides and amide-containing epoxies; glycidyl derivatives of cyanuric acid; glycidyl resins from melamines; glycidyl amines such as triglycidyl ether amine of p-aminophenol and bis(2, 3-epoxypropyl)methylpropylammonium p-toluenesulfonate; glycidyl triazines; thioglycidyl resins such as epoxidized bisulfide; silicon-glycidyl resins such as 1,4-bis [(2,3-epoxypropoxy)dimethylsilyl]; fluorine glycidyl resins; and epoxy resins synthesized from polyglycidyl compounds containing unsaturation such as allyl-substituted diglycidyl ether of bisphenol A; or any combination thereof. Epoxyresin adducts of the above can also be utilized. Epoxy resins that have a viscosity of about 20,000 centipose or less at 27° C. are desired.

A highly preferred epoxy resin is diglycidyl ether of bisphenol A (DGEBA) that has the following formula:

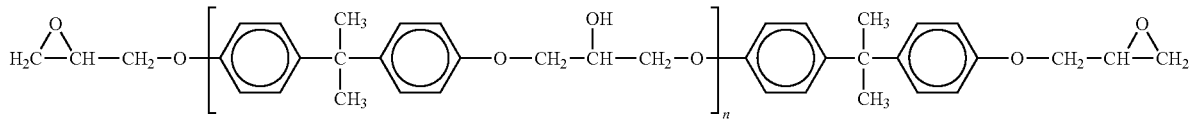

wherein n is from 0 or about 0.1 to about 5, desirably from 0 or about 0.1 to about 3.5, and preferably from 0 or about 0.1 to about 3.0. Other preferred epoxies include diglycidyl ethers of bisphenol F.

The various epoxy resins or polymers generally have a weight average molecular weight of from about 200 to about 600, and desirably from about 300 to about 450. The preferred epoxy polymers generally are di-functional, that is, they have two epoxide groups typically at the terminal position.

An important epoxy toughener of the present invention are one or more carboxyl terminated poly(butadiene acrylonitrile) (CTB) compounds that generally can have a number average molecular weight of from about 2,000 to about 8,000, desirably from about 2,500 to about 5,000, and preferably from about 3,000 to about 4,500. The CTB generally contains no unsaturated nitrile, or if an optional nitrile is utilized, it is preferably acrylonitrile, in an amount of generally from about 0.1% to about 12% by weight, desirably from about 0.1% to about 10% by weight, and preferably from about 0.1% to about 5% by weight based upon the total weight of the carboxylated diene-nitrile copolymer. While "B" generally refers to a butadiene, this term is generically utilized herein to refer to tougheners derived from butadiene, isoprene, or combinations thereof as well as from other conjugated dienes having a total of from about 5 to about 8 carbon atoms such as various pentadienes, various hexadienes, various heptadienes, and the like. CTB is preferably derived from butadiene with carboxylic acid functionality located at both ends of each polymer chain. The preparation of such polymers are well known to the literature and to the art and are also described in prior art patents such as U.S. Pat. Nos. 3,285,949, 5,587,433, and 4,069,384, hereby fully incorporated by reference. Examples of specific CTB include Hypro® 2000x162 made by Emerald Performance Materials, Cuyahoga Falls, Ohio, Poly bd 45 CT made by Sartomer, Eaton, Pa., and the like. An example of a CTB nitrile containing polymer is Hypro® 1300X31 (10% nitrile by weight) made by Emerald Performance Materials.

An important aspect of the present invention is that when one or more epoxy resins are reacted with one or more conventional epoxy tougheners including CTB and CTBN and/or CTBNX, and subsequently blended with one or more unreacted epoxy resins, the result is an epoxy resin blend wherein the CTB is miscible with the unreacted epoxy resin and does not settle out even upon extended storage times. Thus, the epoxy resin blend has no phase separation and has good storage stability.

The one or more CTBN epoxy tougheners of the present invention are well known to the literature and to the art and the same as well as the preparation thereof are set forth in U.S. Pat. Nos. 3,966,837; 4,025,578; 4,107,116; 5,140,068; 5,198,510; 5,268,452; and 5,393,850, hereby fully incorporated by reference. The CTBN tougheners are derived from various compounds wherein "B" is a conjugated diene having the total of from 4 to 8 carbon atoms such as isoprene, pentadiene, hexadiene, etc., with butadiene being highly preferred. The "N" nitrile portion of the toughener is an unsaturated nitrile with acrylonitrile being highly preferred. The amount of the nitrile is generally from about 20% to about 35% or 40% by weight, desirably from about 20% to about 35% by weight, and preferably from about 21% to about 32% by weight based upon the total weight of the carboxylated diene-nitrile copolymer. The number average molecular weight of the carboxylated diene-nitrile copolymer is generally from about 2,000 to about 8,000, desirably from about 2,500 to about 5,000, and preferably from about 3,000 to about 4,500. The CTBN tougheners have a carboxylic acid end group at both ends of each polymer chain. An example of a CTBN epoxy toughener is Hypro®1300X13 (27% nitrile by weight) made by Emerald Performance Materials.

The one or more CTBNX tougheners are similar to the CTBN tougheners in that they can be made from one or more conjugated dienes having a total of from 4 to 8 carbon atoms such as isoprene, butadiene, pentadiene, etc., with butadiene being highly preferred. As with the CTBN polymers, the amount of nitrile rubber is the same and thus is from about 20% to about 35% or 40%, desirably from about 20% to about 35%, and preferably from about 21% to about 32% by weight based upon the total weight of the CTBNX copolymer. Moreover, the number average molecular weight of the CTBNX tougheners is also the same and thus is from about 2,000 to about 8,000, desirably from about 2,500 to about 5,000, and preferably from about 3,000 to about 4,500. The difference with respect to the CTBNX toughener is that in addition to having a carboxylic acid group on both ends of the polymer chain, it can have one or more carboxylic acid groups pendant from the polymer backbone. The additional carboxylic acid group is obtained from utilizing acrylic acid or a derivative thereof, or other unsaturated carboxylic acid, during preparation of the one or more CTBN polymers. That is, while not all of the CTBNX polymers have a pendant carboxylic acid group, an amount thereof is utilized so that the functionality of all of the CTBNX polymers is from about 2.05 to about 2.9, and desirably from about 2.2 to about 2.5. An example of a suitable CTBNX toughener or polymer is Hypro®1300X18 (21% nitrile by weight) made by Emerald Performance Materials, Cuyahoga Falls, Ohio.

The weight ratio of the one or more CTBN and/or one or more CTBNX to the one or more CTB is generally from about 1.0 to about 3.0 with from about 1.0 to about 2.0 being desired. Higher amounts of CTBN and/or CTBNX are avoided since the same increases the viscosity of the epoxy-CTB-CTBN and/or CTBNX resin. Moreover, high weight ratios of CTBN and/or CTBNX to CTB also result in poorer cold temperature properties such as peel strength and the like. The CTBN and/or CTBNX also stabilizes the CTB for extended periods of time such as for at least 3 months, desirably at least 6 or at least 9 months, and preferably at least 12 months to about 36 months, so that as noted above, the CTB is miscible in the unreacted epoxy portion of the blend. By the term "miscible" it is meant that initially and upon storage only a single phase exists and not two visible distinct phases.

The stoichiometric equivalence of all epoxy groups to all carboxyl groups (i.e. CTB, CTBN, and CTBNX) of the reacted epoxy portion of the blend is generally from about 2.0 to about 2.5 and desirably from about 2.0 to about 2.3 with from about 2.0 to about 2.1 equivalents being preferred. A stoichiometric excess of the one or more epoxies is utilized so that the formed rubber adducted epoxy polymer has a epoxy group at both ends and generally only a CTB, or a CTBN or a CTBNX unit within the polymer. Reaction of the various components can generally occur in any order. For example, CTBN and/or CTBNX can be initially reacted with an epoxy and subsequently CTB can be reacted with the remaining unreacted epoxy resin, or vice versa. Preferably, a blend of CTB with CTBN and/or CTBNX is made and subsequently reacted with an epoxy resin. Reaction generally occurs at elevated temperatures such as from about 100° C. to about 140° C. to about 145° C., and desirably from about 110° C. to about 130° C., desirably in the absence of any catalyst. That is, if a catalyst is utilized, only very small amounts thereof are utilized such as about 0.25 parts by weight or less, desirably 0.1 parts by weight or less, and preferably no catalyst at all, based upon 100 parts by weight of the total amount of the one or more epoxies, CTB, CTBN and/or CTBNX components.

Once the reacted epoxy-CTB-CTBN and/or CTBNX resins of the present invention have been synthesized, the resultant rubber modified epoxy resins can be blended, i.e. diluted with one or more additional epoxy resins that can be the same or different as the reacted epoxy resin(s). The produced epoxy resin blend has a room temperature viscosity generally greater than 2,000 centipose. An amount of unreacted epoxy is utilized to lower the CTB-CTBN and/or CTBNX (adduct) content to about 5 to about 40 parts by weight desirably to about 10 to about 30 parts by weight, and preferably to about 15 to about 20 parts by weight based upon 100 total parts by weight of all epoxy resins (reacted and unreacted). When the total amount of all rubber adducts is 15 parts by weight per 100 parts by weight of all epoxy resins, the modified epoxy resin composition has an initial non-aged viscosity at 27° C., that allows easy handling before cure, of from about 10,000 to about 150,000, desirably from about 25,000 to about 100,000, and preferably from about 50,000 to about 75,000 centipose. With respect to 6 month aged rubber modified epoxy compositions containing a total rubber adduct level of 15 parts by weight per 100 parts by weight of total epoxy resins, the viscosities at 27° C. range from about 10,000 to about 150,000, and desirably from about 50,000 to about 75,000 centipose.

The above described rubber toughened epoxy blends of the present invention can be applied as an adhesive mixture containing an epoxy curing agent therein to numerous articles, substrates, and the like, and then cured. Curing agents include amine and polyamine curing agents and include primary, secondary, and tertiary amines having a total of from 2 to about 42 carbon atoms with examples including diethylene triamine, triethylene tetramine, 4,4'-diaminodiphenolmethane as well as various polyaminoamides. Other amine compounds include ureas or substituted ureas. Dicyandiamide (cyanoguanidine and derivatives), is a highly preferred latent curing agent. Other suitable curatives known to the art and to the literature for curing epoxy resins can also be used. The curing agents are utilized in an amount of from about 2 to about 10 parts, desirably 3 to about 8, and preferably 4 to about 6 parts by weight per 100 parts by weight of the epoxy blends of the present invention.

An important aspect of the present invention, as noted above, is that after cure, good low temperature toughness properties are obtained. For example, low temperature peel strengths at minus 40° C. according to ASTM D-1876 are from about 5.0 to about 10.0, desirably from about 6.0 to about 10.0, and preferably from about 7.0 to about 10.0 Newtons per millimeter. Good lap shear properties at 90° C. according to ASTM 1002 are obtained such as from about 1,000 to about 1,100 pounds, with high lap shear strength being most desired. Another notable property of the present invention is that when an adhesive formulation containing the liquid epoxy-CTB-CTBN and/or CTNBX resins are stored or aged for extended times before cure, the physical properties are surprisingly improved. For example, after storage at ambient conditions for approximately 2½ months, the low temperature T-peel strengths at minus 40° C. according to ASTM D-1876 are significantly improved compared to initial T-peel strengths at minus 40° C. Typical 2½ month aged T-peel strengths are from about 7.0 to about 10.0, desirably about 8.0 to about 10.0, and preferably about 9.0 to about 10.0 Newtons per millimeter.

While fillers such as tabular alumina, talc, calcium carbonate, and fumed silica can be utilized, the epoxy-CTB-CTBN and/or CTBNX resins of the present invention are desirably free thereof. That is, generally less than 40 or less than 20 or less than 5 parts by weight of one or more fillers are utilized per 100 total parts by weight of the epoxy-CTB-CTBN and/or CTBNX resin, with no fillers being preferred. Another aspect of the present invention is that synthesis of the epoxy-CTB-CTBN and/or CTBNX resin requires no catalyst. That is, if utilized, a very small amount such as generally about 0.25 parts by weight or less and desirably about 0.10 parts by weight or less of catalyst are utilized per every 100 total parts by weight of the epoxy-CTB-CTBN and/or CTBNX blend, with no catalyst being preferred.

The invention will be better understood by reference to the following examples that serve to illustrate, but not to limit, the preparation of toughened epoxy resins according to the present invention.

Examples 1 through 3 relate to the preparation of rubber modified epoxy resins synthesized with CTB and CTBN or CTBNX wherein the equivalent ratio of the epoxy resin to the total amount of the CTB and CTBN or CTBNX was 2 to 1.

EXAMPLE 1

(Uncured) Preparation of a rubber modified epoxy resin with improved CTB solubility in epoxy resin from a CTBN/CTB 1 to 1 weight ratio blend.

The following compounds were utilized.

| MW | CAS # | Chemical Name | Ephr[1] | Wt (g) |
|---|---|---|---|---|
|  | 68891-46-3 | CTBN 1300x13 (27% wt of nitrile) | 0.058 | 145.0 |
|  | 68891-79-2 | CTB 2000x162 (0% wt of nitrile) | 0.043 | 145.0 |
| 390 | 25068-38-6 | Epon 828 |  | 57.1 |

[1]Carboxyl equivalents per 100 parts resin

Procedure:

All ingredients were weighed in a 1 liter, three-neck mechanically stirred flask equipped with a nitrogen inlet and outlet. The ratio of epoxide functionality to carboxyl functionality was 2 to 1. The ingredients were heated to 120° C. under slow nitrogen purge. The reaction required four hours to reach the $\leq 0.001$ Ephr endpoint. The finished product was an opaque viscous liquid. To test the compatibility of this resin it was further diluted in Epon 828. The adduct, 18 grams, was dissolved in 97 grams of unreacted Epon 828 (15 parts total rubber to 100 total parts epoxy). This combination had a viscosity of 77,433 cps at 27° C., and was still homogeneous after 12 months.

EXAMPLE 2

(uncured) Preparation of a rubber modified epoxy resin with improved CTB solubility in epoxy resin from a CTBN/CTB 2 to 1 weight ratio blend.

The following compounds were utilized.

| MW | CAS # | Chemical Name | Ephr[1] | Wt (g) |
|---|---|---|---|---|
|  | 68891-46-3 | CTBN 1300x13 (27% wt of nitrile) | 0.058 | 200.0 |
|  | 68891-79-2 | CTB 2000x162 (0% wt of nitrile) | 0.044 | 100.0 |
| 390 | 25068-38-6 | Epon 828 |  | 62.4 |

[1]Carboxyl equivalents per 100 parts resin

Procedure:

All ingredients were weighed in a 1 liter, three-neck mechanically stirred flask equipped with a nitrogen inlet and outlet. The ratio of epoxide functionality to carboxyl functionality was 2 to 1. The ingredients were heated to 120° C. under slow nitrogen purge. The reaction required six hours to reach the ≦0.001 Ephr endpoint. The finished product was an opaque viscous liquid. To test the compatibility of this resin it was further diluted in Epon 828. The adduct, 45.1 grams, was dissolved in 241.1 grams of unreacted Epon 828 (15 parts rubber to 100 parts epoxy). This combination had a viscosity of 71,000 cps at 27° C., and was still homogeneous after 12 months.

EXAMPLE 3

(uncured) Preparation of a rubber modified epoxy resin with improved CTB solubility in epoxy resin from a CTBNX/CTB 2 to 1 weight ratio blend.

Examples A through J relate to uncured-viscosity phase separation data. In a manner as set forth with regard to Examples 1, 2, and 3, resins of epoxy-CTB-CTBN and epoxy-CTB-CTBNX were reacted at elevated temperatures but without a filler or catalyst and the same are set forth in Examples A through J wherein the ratio of epoxy functionality to carboxyl functionality was 2 to 1. Subsequently, the reacted epoxy resins (rubber modified epoxy resin) were blended with additional unreacted epoxy resin to achieve an amount of either 15 or 40 parts by weight of the rubber adducts based upon 100 total parts by weight of the total epoxy resin (reacted or unreacted). The results are set forth in Table 1.

TABLE 1

| | Example | | | | | | | |
|---|---|---|---|---|---|---|---|---|
| | A | B | C | D | E | F | G | H |
| CTB-CTBN or CTB-CTBNX | CTB/CTBN 27% nitrile | CTB/CTBN 27% nitrile | CTB/CTBN 27% nitrile | CTB/CTBN 27% nitrile | CTB/CTBN** 27% nitrile | CTB/CTBN*** 27% nitrile | CTB/CTBNX 21% nitrile | CTB/CTBNX 21% nitrile |
| CTB/CTBN or CTBNX (wt ratio) | 1:1 | 1:1 | 1:2 | 1:2 | 1:2 | 1:2 | 1:1 | 1:2 |
| 15 PHR Viscosity, 27° C. (cps) - initial | 77,433 | 73,633 | 71,000 | 134,800 | 102,333 | 117,733 | 102,400 | 223,000 |
| 40 PHR Viscosity, 27° C. (cps) - initial | 436,500 | — | 530,500 | — | — | — | 697,500 | 1,192,000 |
| Phase Separation (15 PHR) | none after 1 yr. | none after 1 yr. | none after 1 yr. | none after 6.5 mo. | none after 6.5 mo. | none after 6.5 mo. | none after 10 mo. | none after 10 mo. |
| Phase Separation (40 PHR) | none after 1 yr. | — | none after 1 yr. | — | — | — | none after 10 mo. | none after 10 mo. |

**CTB reacted with epoxy first
***CTBN reacted with epoxy first

The following compounds were utilized.

| MW | CAS # | Chemical Name | Ephr[1] | Wt (g) |
|---|---|---|---|---|
| | 68891-50-9 | CTBNX 1300x18 (21% wt of nitrile) | 0.066 | 200.0 |
| | 68891-79-2 | CTB 2000x162 (0% wt of nitrile) | 0.047 | 100.0 |
| 390 | 25068-38-6 | Epon 828 | | 69.8 |

[1]Carboxyl equivalents per 100 parts resin

Procedure:

All ingredients were weighed in a 1 liter, three-neck mechanically stirred flask equipped with a nitrogen inlet and outlet. The ratio of epoxide functionality to carboxyl functionality is 2 to 1. The ingredients were heated to 120° C. under slow nitrogen purge. The reaction required ten hours to reach the ≦0.001 Ephr endpoint. The finished product was an opaque viscous liquid. To test the compatibility of this resin it was further diluted in Epon 828. The adduct, 45.1 grams, was dissolved in 241.1 grams of unreacted Epon 828 (15 parts rubber to 100 parts epoxy). This combination had a viscosity of 223,000 cps at 27° C., and was still homogeneous after 12 months.

As apparent from the above examples, the chemical reaction of the epoxy resin with the CTB and the CTBN or CTBNX was run at elevated temperatures in the absence of any filler or catalyst to produce the rubber modified epoxy resins of the present invention. In all three Examples, the CTB was fully miscible with the unreacted epoxy resin.

As set forth in Table 1, good low initial viscosities were generally obtained, when the total amount of the rubber adducts was about 15 parts by weight per 100 total parts by weight of all epoxy resins. That is, at 27° C., generally viscosities were less than about 150,000 centipose, desirably less than about 100,000, and preferably less than about 75,000 centipose.

With respect to phase separation utilizing a total of 15 parts by weight of CTB and CTBN or CTBNX for every 100 parts by weight of epoxy resin, no phase separation was obtained for at least 6½ months in Examples D through F, none after at least 10 months in Examples G and H, and none after one year in Examples A, B, and C. Examples I and J which related to rubber modified epoxy resins wherein the nitrile content of the CTBN was 18 percent, showed significant separation in a matter of a few days. With regard to phase separation utilizing a total of 40 parts by weight of CTB and CTBN or CTBNX per 100 parts by weight of the epoxy resin, the separation data obtained was essentially identical to rubber modified epoxy containing 15 total parts by weight CTB and CTBN or CTBNX per 100 parts by weight of the epoxy resin.

Examples 4 through 12 relate to T-Peel and lap shear data for cured un-aged and aged adhesives. In a manner similar to Examples 1, 2, and 3, resins of epoxy-CTB-CTBN or epoxy-CTB-CTBNX were prepared and reacted to produce rubber toughened cured epoxy resins of Examples 5 through 12 wherein the ratio of epoxide functionality to carboxyl functionality was 2 to 1. Example 4 is a Control wherein the epoxy resin was a commercially available modified epoxy resin, Epon Resin 58005, which contains 40 parts by weight of Hypro 1300X13 (CTBN) and 60 parts by weight of Epon 828.

CTBN 1300x13 contained approximately 27% by weight of bound acrylonitrile whereas CTBNX 1300x18 contained approximately 21% by weight of bound acrylonitrile. Examples 4 through 12 in addition to containing CTB, CTBN, or CTBNX and Epon 828 epoxy resin also contained 5 parts by weight of a latent curing agent of dicyandiamide aurative (Amicure CG-1400), 2 parts by weight of substituted urea curative (Amicure UR-UNGD) and 3 parts by weight of fumed silica filler (Cab-0 Sil TS-720). After reaction to form an adducted epoxy resin, additional unreacted Epon 828 was added so that for every 100 total parts of epoxy resin (reacted and unreacted) the total amount of CTB, CTBN, and CTBNX was 15 parts by weight. Expoxy control Example 4 and rubber modified epoxy resin Examples 5 through 12 containing the latent curing agent were formulated into an adhesive containing the added unreacted epoxy resin, applied to acetone wiped electrogalvanized steel coupons, cured for 30 minutes at a temperature of 177° C., and then tested with respect to T-peel (N/mm) at room temperature in accordance with ASTM D-1876, with respect to T-peel (N/mm) at minus 40° C. in accordance with ASTM D-1876, and with respect to Lap Shear (lbs.) at 90° C. in accordance with ASTM D-1002. The results are set forth in Table 2.

Considering the aged data properties of Table 2 wherein the adhesive formulation containing epoxy-CTB-CTBN and the epoxy-CTB-CTBNX composition were aged before being cured by a crosslinking agent, Examples 5 through 8 (aged 2.5 months) generally show significant increases in the T-peel strength at room temperature and at minus 40° C. as opposed to the same examples that were not aged.

Examples 5 and 6 (aged 6 months) showed a slight decrease in minus 40° C. T-peel strengths as compared to aging for 2.5 months, but still yielded much higher peel strength at room temperature and at minus 40° C. compared to the same examples that were not aged.

In summary, rubber modified epoxy resins derived from mixtures of CTBN and/or CTBNX containing high weight amounts of nitrile therein and CTB yield improved toughening properties in a cured adhesive, especially at minus 40° C. When the adhesive formulations containing epoxy-CTB-CTBN and/or CTBNX resins were aged or stored for months before being cured, even better minus 40 T-peel strength and 90° C. lap shear strength properties were obtained.

TABLE 2

| | Example | | | | | | | | |
|---|---|---|---|---|---|---|---|---|---|
| | 4 | 5 | 6 | 7 | 8 | 9 | 10 | 11 | 12 |
| CTB/CTBN or CTB/CTBNX | Epon 58005 CTBN - 27% nitrile (Control) | CTB/CTBN (27% nitrile) | CTB/CTBN (27% nitrile) | CTB/CTBNX (21% nitrile) | CTB/CTBNX (21% nitrile) | CTB/CTBN (27% nitrile) | CTB/CTBN* (27% nitrile) | CTB/CTBN** (27% nitrile) | CTBCTBN*** (27% nitrile) |
| CTB/CTBN or CTBNX (wt ratio) | — | 1:1 | 1:2 | 1:1 | 1:2 | 1:2 | 1:2 | 1:2 | 1:2 |
| T-Peel (N/mm), RT | 9.37 ± .12 | 5.89 ± 0.14 | 5.47 ± 0.15 | 6.5 ± 0.39 | 7.17 ± 0.27 | 8.24 ± 0.24 | 9.20 ± 0.19 | 5.73 ± 0.08 | 6.6 ± .06 |
| T-Peel (N/mm), −40° C. | 2.03 ± 0.17 | 6.08 ± 0.28 | 3.4 ± 0.54 | 7.32 ± 0.19 | 6.21 ± 0.53 | 6.60 ± 0.89 | 3.14 ± 0.30 | 3.97 ± .50 | 6.13 ± 0.42 |
| Lap Shear (lbs), 90° C. | 1020 ± 22 | 1030 ± 4 | 981 ± 4 | 1030 ± 7 | 1060 ± 2 | 1110 ± 13 | 1110 ± 8 | 1090 ± 6 | 1120 ± 6 |
| T-Peel (N/mm), RT (aged 2.5 months) | 9.07 ± 0.32 | 9.52 ± 0.33 | 10.1 ± 0.33 | 8.04 ± 0.20 | 8.29 ± 0.66 | 8.70 ± 0.54 | 8.44 ± 0.99 | — | — |
| T-Peel (N/mm), −40° C. (aged 2.5 months) | 2.83 ± 0.51 | 9.73 ± 0.14 | 9.07 ± 0.28 | 9.46 ± 0.39 | 7.47 ± 0.23 | 5.70 ± 0.12 | — | — | — |
| Lap Shear (lbs), 90° C. (aged 2.5 months) | 1030 ± 3 | 1030 ± 7 | 1060 ± 28 | 1090 ± 7 | 1080 ± 5 | 190 ± 11 | 1100 ± 4 | — | — |
| T-Peel (N/mm), RT (aged 6 months) | 8.24 ± 0.12 | 9.42 ± 1.08 | 9.39 ± 0.59 | — | — | — | — | — | — |
| T-Peel (N/mm), −40° C. (aged 6 months) | 2.68 ± 0.31 | 8.71 ± 0.22 | 7.25 ± 0.24 | — | — | — | — | — | — |
| Lap Shear (lbs) (aged 6 months) | 1100 ± 14 | 1110 ± 12 | 1120 ± 41 | — | — | — | — | — | — |

*Adduct aged 6 months before formulation
**CTB reacted with epoxy first
***CTBN reacted with epoxy first As apparent from Table 2, with regard to the un-aged properties, the room temperature T-peel strengths of Examples 5 through 12 were adequate. Unexpectedly good minus 40° C. T-Peel strengths were obtained with Examples 5, 7 through 9, and 12. The lap shear strengths at 90° C. were similar to the Control, Example 4.

Examples 13 and 14 relate to unaged T-Peel and lap shear data. In a manner as similar to Examples 1, 2, and 3, resins of epoxy-CTBN and CTB containing 10% by weight of nitrile therein are reacted at elevated temperatures with no filler and no catalyst wherein the functionality of epoxy to carboxyl was 2 to 1. The formulation of Examples 13 and 14 were as follows:

TABLE 3

| MW | CAS # | Chemical Name | Ephr | Wt (g) | Eq. |
|---|---|---|---|---|---|
| 390 | 68891-46-3 | CTBN 1300x13 (BQ070353) (27% of nitrile) | 0.058 | 150.0 | 0.087 |
| | 68891-46-3 | CTB 1300x31 (BQ080132) (10% of nitrile) | 0.051 | 150.0 | 0.077 |
| | 25068-38-6 | Epon 828 | | 63.8 | 0.164 |

Procedure:

All ingredients were weighed in a 1 liter, three-neck mechanically stirred flask equipped with a nitrogen inlet and outlet. The ingredients were then heated to 120° C. under a slow nitrogen purge and reacted for greater than 10 hours to reach a ≦0.001 Ephr endpoint. The reacted epoxy, CTB containing a low amount of nitrile, and the CTBN was diluted with additional Epon 828 to achieve a composition that contained 15 parts by weight of CTB, 18.2 parts by weight of CTBN adduct, and 96.8 parts by weight of total epoxy resin, i.e. a composition containing approximately 15 parts by weight of the CTB rubber per 100 total parts by weight of all epoxy resins. The viscosity of the composition was approximately 38,800 cps at 27° C.

In order to test the adhesive properties of the composition, it was cured according to the following recipe and tested with regard to T-Peel (N/mm) at room temperature in according with ASTM D-1876, with respect to T-Peel (N/mm) at minus 40° C. in accordance with ASTM D-1876, and with respect to Lap Shear (lbs.) at 90° C. in accordance with ASTM D-1002. The recipe and physical test properties are set forth in Table 4.

TABLE 4

| Chemical | 13 | 14 |
|---|---|---|
| DGEBA | 0 | 0 |
| 58005 | 0 | 0 |
| 1300x31/1300x13 (1:1 by wt), 15 phr | 100 | 0 |
| 1300x31/1300x13 (2:1 by wt), 15 phr | 0 | 100 |
| Amicure CG-1400 | 5 | 5 |
| Amicure UR | 2 | 2 |
| Cab-O-Sil TS-720 | 3 | 3 |
| T-Peel (N/mm), RT | 6.73 +/− 0.294 | 5.26 +/− 0.147 |
| T-Peel (N/mm), −40° C. | 4.69 +/− 0.747 | 3.96 +/− 0.389 |
| Lap Shear (lbs), 90° C. | 1010 +/− 6.92 | 1010 +/− 8.06 |

As apparent from Examples 13 and 14, suitable low temperature minus 40° C. T-Peel strengths were obtained as well as 90° C. lap shear strengths.

The rubber modified epoxy resins of the present invention can be utilized wherever epoxy resins have been used or can be used and desirably have good toughness and especially low temperature peel resistance strength. Generally the rubber modified epoxy resins of the present invention can be used in paste and film structural adhesives, for the production of various specific articles, components, and structural forms in numerous applications such as bonding automotive and aerospace components. The toughened epoxy adhesives of the present invention are desirably in any material or bonding application requiring excellent low temperature toughness as well as toughness and impact resistance. They are also effective in systems that do not contain higher molecular epoxy resins or polymers. Therefore adhesives with lower viscosity can be formulated and still have exceptional cured peel strength.

In accordance with the patent statutes, the best mode and preferred embodiments have been set forth, the scope of the invention is not limited thereto, but rather by the scope of the attached claims.

What is claimed is:

1. A one part blend of uncured epoxy resins, comprising:
a reaction product of one or more epoxy resins with one or more carboxyl terminated polybutadienes (CTB) and with one or more carboxyl terminated poly(butadiene-acrylonitrile)s (CTBN) or with one or more random pendant and terminal carboxyl functional poly(butadiene acrylonitrile)s (CTBNX) or with both said CTBN and said CTBNX, with the proviso, that the weight ratio of said CTBN or said CTBNX or both said CTBN and said CTBNX to said CTB is from about 1.0 to about 3.0, wherein said CTBN and said CTBNX have a nitrile content, independently, of from about 20% to about 40% by weight, and wherein the stoichiometric equivalence of the total amount of said epoxy resins to the total stoichiometric equivalence of said CTB, and said CTBN and said CTBNX is from about 2.0 to about 2.5,
an amount of unreacted epoxy resin so that the total amount of said CTB and said CTBN and said CTBNX is from about 5 parts to about 40 parts by weight per 100 total parts by weight of said reacted and said unreacted epoxy resin;
wherein said blend of said reacted product and said unreacted epoxy resin contains less than about 0.25 parts by weight of a catalyst per 100 total parts by weight of the total amount of all epoxies, CTB, CTBN, and/or CTBNX components;
wherein said blend contains less than 40 parts by weight of one or more inorganic fillers per 100 total parts by weight of said reacted epoxy-CTB-CTBN and/or epoxy-CTB-CTBNX resin; and
wherein said blend of said uncured reacted product and said unreacted epoxy resin are miscible upon storage.

2. The blend of epoxy resins according to claim 1, wherein said one or more epoxy resins and said unreacted epoxy resin, independently, comprises a glycidyl or diglycidyl ether of novolac resin; glycidyl ether of di-, and trihydric phenol; glycidyl or diglycidyl ether of bisphenol; glycidyl ether of polynuclear phenol; epoxy resin made from diphenolic acid; glycidyl ether of aliphatic polyol: glycidyl ester; glycidyl epoxy containing nitrogen; glycidyl derivative of cyanuric acid; glycidyl resin from melamine; glycidyl amine; glycidyl triazine; thioglycidyl resin; silicon-glycidyl resin; fluorine glycidyl resin; and epoxy resin synthesized from a polyglycidyl compound containing unsaturation; or a diglycidyl ether or a polyglycidyl ether in lieu of any of said above glycidyl ethers; or any combination thereof,
wherein said CTB optionally contains from about 0.1% to about 12% by weight of a nitrile; wherein the number average molecular weight of said CTB is from about 2,000 to about 8,000, wherein the number average molecular weight of said CTBN is from about 2,000 to about 8,000, and wherein the number average molecular weight of said CTBNX compound is from about 2,000 to about 8,000.

3. The blend of epoxy resins according to claim 2, wherein the nitrile content of said CTBN is from about 20% to about 35% by weight based upon the total weight of said CTBN compound, wherein the nitrile content of said CTBNX is from about 20% to about 35% by weight based upon the total weight of said CTBN compound, and wherein said B of said CTB compound is butadiene.

4. The blend of epoxy resins according to claim 3, wherein said epoxy resin is the diglycidyl ether of bisphenol A; wherein the weight ratio of said CTBN or said CTBNX or both said CTBN and CTBNX to said CTB is from about 1 to about 2; wherein said B of said CTBN is derived from butadiene, wherein said B of said CTBNX is derived from butadiene; wherein the stoichiometric equivalence of the total amount of said reacted epoxy resins to the total stoichiometric equivalence of said CTB and said CTBN and said CTBNX is from about 2.0 to about 2.3, and wherein the amount of said filler is less than 20 parts by weight.

5. The blend of epoxy resins according to claim 4, wherein said CTB is miscible with said unreacted epoxy resin for at least three months.

6. A cured composition of claim 4, including a curing agent that is an amine compound, wherein said cured composition has a peel strength at minus 40° C. according to ASTM D-1876 of from about 6 to about 10 Newtons per millimeter 7. The blend of epoxy resins according to claim 4, wherein the nitrile content of said CTBN is from about 21% to 32% by weight, wherein the nitrile content of said CTBNX is from about 21% to about 32% by weight, wherein the number average molecular weight of said CTB is from about 3,000 to about 4,500, wherein the number average molecular weight of said CTBN is from about 3,000 to about 4,500, wherein the number average molecular weight of said CTBNX is from about 3,000 to about 4,500; and wherein the total amount of said CTB and said CTBN and said CTBNX, is from about 10 parts to about 30 parts by weight per 100 total parts by weight of said reacted and unreacted epoxy resin.

8. The blend of epoxy resins according to claim 7, wherein said CTB is miscible with said unreacted epoxy resin for at least six months.

9. A cured composition of claim 8, including a curing agent that is dicyandiamide, and wherein said cured composition has a peel strength at minus 40° C. according to ASTM D-1876 of from about 7 to about 10 Newtons per millimeter.

10. The blend of epoxy resins according to claim 1, wherein said CTB is miscible with said unreacted epoxy resin.

11. A cured composition of claim 10, including a curing agent that is an amine compound comprising a primary, secondary, or a tertiary amine having a total of from 2 to about 42 carbon atoms, or a urea, or a substituted urea compound, or any combination thereof, wherein said cured composition has a peel strength at minus 40° C. according to ASTM D-1876 of from about 6 to about 10 Newtons per millimeter.

12. A cured composition of claim 1, wherein said cured composition has a peel strength at minus 40° C. according to ASTM D-1876 of from about 5 to about 10 Newtons per millimeter.

13. A process for making a one part blend of uncured epoxy resins containing a carboxyl terminated polybutadiene (CTB) rubber adducted epoxy resin comprising the steps of:

reacting one or more epoxy resins with one or more of said CTB and with one or more carboxyl terminated poly (butadiene-acrylonitrile)s (CTBN), or with one or more random pendant and terminalcarboxyl functional poly (butadiene acrylonitrile)s (CTBNX) or with both said CTBN and said CTBNX, with the proviso that the weight ratio of said CTBN or said CTBNX or both said CTBN and said CTBNX to said CTB is from about 1.0 to about 3.0, wherein said CTB optionally contains a nitrile content of from about 0.1% to about 12% by weight, wherein said CTBN and said CTBNX have a nitrile content, independently, of from about 20% to about 40% by weight, and wherein the stoichiometric equivalence of the total amount of said epoxy resin to the total stoichiometric equivalence of said CTB, and said CTBN and said CTBNX is from about 2.0 to about 2.5, subsequently blending said reacted epoxy resin with an amount of unreacted epoxy resin so that the total amount of said CTB and said CTBN and said CTBNX is from about 5 parts to about 40 parts by weight per 100 total parts by weight of said reacted and unreacted epoxy resin;

said blend of said reaction product and said unreacted epoxy resin containing about 0.25 parts by weight or less of a catalyst per 100 parts by weight of the total amount of said one or more epoxies, said CTB, said CTBN, and/or said CTBNX components;

wherein said blend contains less than 40 parts by weight of one or more inorganic fillers per 100 total parts by weight of said reacted epoxy-CTB-CTBN and/or epoxy-CTB-CTBNX resin; and wherein upon aging said blend of said uncured reaction product and said unreacted epoxy resin are miscible.

14. The process of claim 13, wherein said one or more epoxy resins and said unreacted epoxy resins, independently, comprises a glycidyl or diglycidyl ether of novolac resin; glycidyl ether of di-, and trihydric phenol; glycidyl or diglycidyl ether of bisphenol; glycidyl ether of polynuclear phenol; epoxy resin made from diphenolic acid; glycidyl ether of aliphatic polyol: glycidyl ester; glycidyl epoxy containing nitrogen; glycidyl derivative of cyanuric acid; glycidyl resin from melamine; glycidyl amine; glycidyl triazine; thioglycidyl resin; silicon-glycidyl resin; fluorine glycidyl resin; and epoxy resin synthesized from a polyglycidyl compound containing unsaturation; or a diglycidyl ether or a polyglycidyl ether in lieu of any of said glycidyl ethers; or any combination thereof, wherein the number average molecular weight of said CTB is from about 2,000 to about 8,000, wherein the number average molecular weight of said CTBN is from about 2,000 to about 8,000, and wherein the number average molecular weight of said CTBNX compound is from about 2,000 to about 8,000, and wherein the nitrile content of said CTBN is from about 20% to about 35% by weight based upon the total weight of said CTBN compound, wherein the nitrile content of said CTBNX is from about 20% to about 35% by weight based upon the total weight of said CTBN compound, and wherein said B of said CTB compound is butadiene.

15. The process of claim 14, wherein said epoxy resin is the diglycidyl ether of bisphenol A; wherein the weight ratio of said CTBN or CTBNX or both said CTBN and said CTBNX to said CTB is from about 1 to about 2; wherein said B of said CTBN is derived from butadiene, wherein said B of said CTBNX is derived from butadiene; and wherein said stoichiometric equivalence of the total amount of said reacted epoxy resins to the total stoichiometric equivalence of said CTB, and said CTBN and said CTBNX is from about 2.0 to about 2.3, and wherein the nitrile content of said CTBN is from about 21% to 32% by weight, wherein the nitrile content of said CTBNX is from about 21% to about 32% by weight, wherein the number average molecular weight of said CTB is from about 3,000 to about 4,500, wherein the number average molecular weight of said CTBN is from about 3,000 to about 4,500, wherein the number average molecular weight of said CTBNX is from about 3,000 to about 4,500; and wherein the total amount of said CTB and said CTBN and said CTBNX is from about 10 parts to about 30 parts by weight per 100 total parts by weight of said reacted and unreacted epoxy resin, and wherein the amount of said filler is less than 20 parts by weight.

16. The process of claim 15, wherein upon aging for at least three months said blend of said reactive epoxy resin and said unreacted epoxy resin are miscible.

17. The process of claim 14, including a curing agent, curing said blend of said reactive epoxy resin and said unreacted epoxy resin, wherein said curing agent comprises a primary, secondary, or a tertiary amine having a total of from 2 to about 42 carbon atoms, or a urea, or a substituted urea compound, or any combination thereof, and wherein said cured blend has a minus 40° C. ASTM D-1876 Peel strength of at least 7.0 Newtons per millimeter.

18. The process of claim 13, wherein upon aging for at least three months said blend of said reactive epoxy resin and said unreacted epoxy resin are miscible.

19. The process of claim 18, including a curing agent, curing said aged adhesive formulation containing the blend of said reactive epoxy resin and said unreacted epoxy resin, wherein said curing agent is dicyandiamide, and wherein said cured blend has a minus 40° C. ASTM D-1876 Peel strength of at least 8.0 Newtons per millimeter.

20. The process of claim 13, including curing said blend of said reactive epoxy resin and said unreacted epoxy resin, and wherein said cured blend has a minus 40° C. ASTM D-1876 Peel strength of at least 6.0 Newtons per millimeter.

* * * * *